Patented Nov. 5, 1929

1,734,951

UNITED STATES PATENT OFFICE

MAX H. ZIMMERMANN, OF NEWINGTON, NEW HAMPSHIRE, ASSIGNOR, BY MESNE ASSIGNMENTS, TO ALBERT C. BURRAGE, JR., OF IPSWICH, MASSACHUSETTS

AGE-RESISTING COMPOUND FOR VULCANIZED RUBBER

No Drawing. Application filed June 4, 1929. Serial No. 368,436.

This invention relates to vulcanized rubber and to means for preventing the deleterious effects of oxidation or aging thereon.

The effects of aging upon vulcanized rubber, especially when exposed to the atmosphere and to sunlight,—including loss of resiliency, strength and the like,—are well known and are frequently attributed to oxidation. Such effects obviously reduce the quality and value of the rubber and are accordingly undesirable.

Accordingly, an object of this invention is to provide a vulcanized rubber which shall be substantially resistant to the effects of aging or oxidation. Other objects will appear from the following disclosure.

Generically, the invention includes the provision of vulcanized rubber characterized by containing, as the age-resisting or anti-oxident compound, a substituted nitroso-amine, typified by the formula:

in which R and R' represent alkyl or aryl radicals (or nuceli) which may be alike or unlike and may contain or be associated with one or more substituents.

In a representative example of the invention rubber and the usual vulcanizing and filler materials, with or without an accelerator, and the required amount of the aging or anti-oxidant, reagent may be compounded and mixed in the usual way, as by milling, and subsequently molded and vulcanized to the desired cure, as by heating to the usual range of vulcanization temperatures.

In a typical application of the invention, under the usual vulcanizing procedure, rubber compounds were prepared as follows:

I 100 parts rubber
40.5 parts carbon black
5.0 parts ZnO
3.0 parts sulphur
5.0 parts mineral rubber
3.0 parts stearic acid
.8 parts mercapto benzo thiazole

II

Same as Formula I with addition of 1.0 part diphenyl nitroso-amine.

III

Same as Formula II with addition of 0.75 part diphenyl nitroso-amine.

IV

Same as Formula I with addition of 0.50 part diphenyl nitroso-amine.

These compounds were severally mixed, as by milling in the usual manner, and then molded in thin sheets in a vulcanizing mold and vulcanized at 20 lbs. steam pressure. Samples of each compound were thus vulcanized for periods of 30, 45, and 60 minutes, respectively. One portion (or more) of each sample was then subjected to a tensile strength test, the results being given in the row indicated by the letter "A" in the following table; and another portion was subjected to an oxygen aging test of 48 hours in an oxygen bomb at 70° C. and a pressure of 300 lbs. per square inch of oxygen and then subjected to the tensile strength test, the results being given in the corresponding row indicated by "B" in the table.

*Table I*

Cure at twenty pounds steam pressure

30 Minutes

| | | 300% | 500% | Final tensile lbs. per sq. in. | Final elongation in per cent |
|---|---|---|---|---|---|
| I | A | 735 | 1965 | 3460 | 685 |
| | B | 784 | 1856 | 2690 | 635 |
| II | A | 380 | 1140 | 2120 | 675 |
| | B | 400 | 1090 | 1705 | 625 |
| III | A | 583 | 1675 | 2930 | 680 |
| | B | 617 | 1610 | 2410 | 635 |
| IV | A | 637 | 1820 | 3100 | 665 |
| | B | 665 | 1675 | 2780 | 675 |

*Table I—Continued*

45 Minutes

| | | 300% | 500% | Final tensile lbs. per sq. in. | Final elongation in per cent |
|---|---|---|---|---|---|
| I | A | 958 | 2420 | 4050 | 670 |
| | B | 955 | 2085 | 2810 | 630 |
| II | A | 712 | 2000 | 3420 | 680 |
| | B | 773 | 1885 | 2870 | 645 |
| III | A | 948 | 2440 | 4125 | 675 |
| | B | 910 | 2200 | 3365 | 665 |
| IV | A | 910 | 2500 | 4150 | 675 |
| | B | 935 | 2240 | 3340 | 655 |

60 Minutes

| | | 300% | 500% | Final tensile | Final elongation |
|---|---|---|---|---|---|
| I | A | 1105 | 2830 | 4050 | 640 |
| | B | 1050 | 2180 | 2660 | 605 |
| II | A | 985 | 2660 | 4150 | 660 |
| | B | 972 | 2380 | 3455 | 655 |
| III | A | 1135 | 2880 | 4175 | 635 |
| | B | 1220 | 2600 | 3330 | 620 |
| IV | A | 1120 | 2930 | 4280 | 625 |
| | B | 1120 | 2520 | 3280 | 615 |

Similar vulcanizing experiments were carried out with rubber compositions containing other nitroso-amines, including both like and unlike substituents and hydrocarbon radicals of both the aliphatic and aromatic series. The experimental results thus obtained are presented in the following tables:

*Table II*

| | A | B | C | D |
|---|---|---|---|---|
| Smoked sheets | 100 | 100 | 100 | 100 |
| Carbon black | 40 | 40 | 40 | 40 |
| Mineral rubber | 5 | 5 | 5 | 5 |
| Zinc oxide | 5 | 5 | 5 | 5 |
| Sulphur | 3 | 3 | 3 | 3 |
| Stearic acid | 3 | 3 | 3 | 3 |
| Mercapto benzo thiazole | 0.8 | 0.8 | 0.8 | 0.8 |
| Phenylbetanaphthylnitroso-amine | 0 | 0.75 | 0 | 0 |
| Benzyl phenyl nitroso-amine | 0 | 0 | 0.75 | 0 |
| Carbazol nitroso-amine | 0 | 0 | 0 | 0.75 |

| Stock | Cure Min. | Cure Pounds pressure | 300% | 500% | Final tensile lbs. per sq. in. | Final elongation in per cent |
|---|---|---|---|---|---|---|
| A | 60 | 20 | 740 | 2010 | 3335 | 660 |
| B | 60 | 20 | 737 | 2110 | 3535 | 665 |
| C | 60 | 20 | 821 | 2200 | 3720 | 670 |
| D | 60 | 20 | 700 | 2020 | 3450 | 680 |
| A | 75 | 20 | 843 | 2250 | 3660 | 670 |
| B | 75 | 20 | 880 | 2390 | 3910 | 665 |
| C | 75 | 20 | 985 | 2600 | 4260 | 705 |
| D | 75 | 20 | 850 | 2280 | 3700 | 660 |
| A | 90 | 20 | 930 | 2460 | 3890 | 660 |
| B | 90 | 20 | 990 | 2600 | 3950 | 630 |
| C | 90 | 20 | 1068 | 2720 | 4110 | 640 |
| D | 90 | 20 | 960 | 2580 | 3950 | 650 |

*Table II—Continued*

Aged 48 hrs. at 70° C. with 300 lbs. oxygen pressure

| Stock | Cure Min. | Cure Pounds pressure | 300% | 500% | Final tensile lbs. per sq. in. | Final elongation in per cent |
|---|---|---|---|---|---|---|
| A | 60 | 20 | 715 | 1480 | 1560 | 510 |
| B | 60 | 20 | 915 | 2100 | 3050 | 640 |
| C | 60 | 20 | 840 | 1920 | 2365 | 585 |
| D | 60 | 20 | 762 | 1620 | 1905 | 570 |
| A | 75 | 20 | 812 | 1550 | 1550 | 470 |
| B | 75 | 20 | 986 | 2370 | 3160 | 620 |
| C | 75 | 20 | 1075 | 2150 | 2520 | 565 |
| D | 75 | 20 | 837 | 1770 | 2020 | 565 |
| A | 90 | 20 | 810 | 1500 | 1500 | 480 |
| B | 90 | 20 | 1058 | 2490 | 3040 | 595 |
| C | 90 | 20 | 1100 | 2245 | 2520 | 560 |
| D | 90 | 20 | 900 | 1800 | 1875 | 520 |

*Table III*

| | A | B | C | D |
|---|---|---|---|---|
| Smoked sheets | 100 | 100 | 100 | 100 |
| Carbon black | 40 | 40 | 40 | 40 |
| Mineral rubber | 5 | 5 | 5 | 5 |
| Zinc oxide | 5 | 5 | 5 | 5 |
| Sulphur | 3 | 3 | 3 | 3 |
| Stearic acid | 3 | 3 | 3 | 3 |
| Mercapto benzo thiazole | 0.8 | 0.8 | 0.8 | 0.8 |
| Dibeta naphthyl nitroso-amine | 0 | 0.75 | 0 | 0 |
| Phenylbetanaphthylnitroso-amine | 0 | 0 | 0.75 | 0 |
| Phenyl alpha naphthyl nitroso-amine | 0 | 0 | 0 | 0.75 |

| Stock | Cure Min. | Cure Pounds pressure | 300% | 500% | Final tensile lbs. per sq. in. | Final elongation in per cent |
|---|---|---|---|---|---|---|
| A | 60 | 20 | 696 | 1965 | 3590 | 710 |
| B | 60 | 20 | 830 | 2240 | 4000 | 700 |
| C | 60 | 20 | 762 | 2100 | 3700 | 700 |
| D | 60 | 20 | 667 | 1905 | 3200 | 655 |
| A | 75 | 20 | 850 | 2200 | 3890 | 700 |
| B | 75 | 20 | 867 | 2360 | 3850 | 650 |
| C | 75 | 20 | 900 | 2365 | 3840 | 665 |
| D | 75 | 20 | 840 | 2320 | 3760 | 655 |
| A | 90 | 20 | 940 | 2430 | 4000 | 675 |
| B | 90 | 20 | 985 | 2650 | 4075 | 655 |
| C | 90 | 20 | 985 | 2600 | 4000 | 655 |
| D | 90 | 20 | 970 | 2580 | 4000 | 655 |

Aged 48 hrs. at 70° C. with 300 lbs. oxygen pressure

| Stock | Cure Min. | Cure Pounds pressure | 300% | 500% | Final tensile lbs. per sq. in. | Final elongation in per cent |
|---|---|---|---|---|---|---|
| A | 60 | 20 | 640 | 1450 | 1725 | 545 |
| B | 60 | 20 | 896 | 2080 | 2965 | 630 |
| C | 60 | 20 | 810 | 1955 | 2880 | 650 |
| D | 60 | 20 | 765 | 1880 | 2760 | 640 |
| A | 75 | 20 | 756 | 1530 | 1630 | 510 |
| B | 75 | 20 | 914 | 2230 | 2940 | 610 |
| C | 75 | 20 | 975 | 2240 | 3120 | 645 |
| D | 75 | 20 | 883 | 2140 | 3120 | 640 |
| A | 90 | 20 | 809 | | 1520 | 460 |
| B | 90 | 20 | 1045 | 2300 | 3130 | 630 |
| C | 90 | 20 | 995 | 2275 | 3035 | 605 |
| D | 90 | 20 | 1030 | 2300 | 3080 | 615 |

*Table IV*

| | A | B | C | D |
|---|---|---|---|---|
| Smoked sheets | 100 | 100 | 100 | 100 |
| Carbon black | 40 | 40 | 40 | 40 |
| Mineral rubber | 5 | 5 | 5 | 5 |
| Zinc oxide | 5 | 5 | 5 | 5 |
| Sulphur | 3 | 3 | 3 | 3 |
| Stearic acid | 3 | 3 | 3 | 3 |
| Mercapto benzo thiazole | 0.8 | 0.8 | 0.8 | 0.8 |
| Diethylnitroso-amine | 0 | 0.75 | 0 | 0 |
| Piperidine-nitroso-amine | 0 | 0 | 0.75 | 0 |
| Methyl-phenyl-nitroso-amine | 0 | 0 | 0 | 0.75 |

Table IV—Continued

| Stock | Cure | | 300% | 500% | Final tensile lbs. per sq. in. | Final elongation in per cent |
|---|---|---|---|---|---|---|
| | Min. | Pounds pressure | | | | |
| A | 60 | 20 | 675 | 1870 | 3350 | 690 |
| B | 60 | 20 | 715 | 1955 | 3475 | 675 |
| C | 60 | 20 | 820 | 2200 | 3780 | 680 |
| D | 60 | 20 | 712 | 2020 | 3370 | 665 |
| A | 75 | 20 | 780 | 2120 | 3630 | 680 |
| B | 75 | 20 | 895 | 2430 | 3860 | 655 |
| C | 75 | 20 | 1055 | 2820 | 4220 | 640 |
| D | 75 | 20 | 960 | 2490 | 3940 | 655 |
| A | 90 | 20 | 922 | 2440 | 3970 | 670 |
| B | 90 | 20 | 962 | 2610 | 3910 | 640 |
| C | 90 | 20 | 1168 | 2900 | 4160 | 630 |
| D | 90 | 20 | 1120 | 2825 | 4120 | 630 |

Aged 48 hrs. at 70° C. with 300 lbs. oxygen pressure

| A | 60 | 20 | 743 | 1670 | 2160 | 585 |
|---|---|---|---|---|---|---|
| B | 60 | 20 | 810 | 1825 | 2070 | 530 |
| C | 60 | 20 | 875 | 1970 | 2360 | 580 |
| D | 60 | 20 | 788 | 1870 | 2490 | 600 |
| A | 75 | 20 | 893 | 1885 | 2170 | 540 |
| B | 75 | 20 | 868 | 1855 | 2245 | 570 |
| C | 75 | 20 | 1030 | 2140 | 2360 | 550 |
| D | 75 | 20 | 1000 | 2300 | 2700 | 580 |
| A | 90 | 20 | 900 | 1900 | 2125 | 535 |
| B | 90 | 20 | 933 | 1915 | 2145 | 545 |
| C | 90 | 20 | 1078 | 2060 | 2110 | 510 |
| D | 90 | 20 | 1085 | 2170 | 2420 | 535 |

Table V

| | A | B | C | D |
|---|---|---|---|---|
| Smoked sheets | 100 | 100 | 100 | 100 |
| Carbon black | 40 | 40 | 40 | 40 |
| Mineral rubber | 5 | 5 | 5 | 5 |
| Zinc oxide | 5 | 5 | 5 | 5 |
| Sulphur | 3 | 3 | 3 | 3 |
| Stearic acid | 3 | 3 | 3 | 3 |
| Mercapto benzo thiazole | 0.8 | 0.8 | 0.8 | 0.8 |
| Dialphanaphthylnitroso-amine | 0 | 0.75 | 0 | 0 |
| Phenyltolylnitroso-amine | 0 | 0 | 0.75 | 0 |
| Ditolylnitroso-amine | 0 | 0 | 0 | 0.75 |

| Stock | Cure | | 300% | 500% | Final tensile lbs. per sq. in. | Final elongation in per cent |
|---|---|---|---|---|---|---|
| | Min. | Pounds pressure | | | | |
| A | 60 | 20 | 858 | 2250 | 3660 | 660 |
| B | 60 | 20 | 770 | 2120 | 3620 | 680 |
| C | 60 | 20 | 818 | 2170 | 3470 | 660 |
| D | 60 | 20 | 845 | 2160 | 3380 | 660 |
| A | 75 | 20 | 925 | 2400 | 3975 | 665 |
| B | 75 | 20 | 832 | 2360 | 3820 | 660 |
| C | 75 | 20 | 975 | 2420 | 4030 | 670 |
| D | 75 | 20 | 933 | 2430 | 4050 | 680 |
| A | 90 | 20 | 1040 | 2560 | 4120 | 675 |
| B | 90 | 20 | 1050 | 2680 | 4000 | 635 |
| C | 90 | 20 | 1080 | 2720 | 4010 | 645 |
| D | 90 | 20 | 1050 | 2670 | 3820 | 625 |

Aged 48 hrs. at 70° C. with 300 lbs. oxygen pressure

| A | 60 | 20 | 858 | 1890 | 2800 | 650 |
|---|---|---|---|---|---|---|
| B | 60 | 20 | 780 | 2000 | 3095 | 660 |
| C | 60 | 20 | 838 | 2100 | 3200 | 660 |
| D | 60 | 20 | 798 | 1990 | 3005 | 650 |
| A | 75 | 20 | 900 | 2075 | 2850 | 630 |
| B | 75 | 20 | 930 | 2245 | 3307 | 630 |
| C | 75 | 20 | 972 | 2310 | 3410 | 645 |
| D | 75 | 20 | 972 | 2285 | 3330 | 650 |
| A | 90 | 20 | 985 | 2160 | 2890 | 620 |
| B | 90 | 20 | 980 | 2375 | 3380 | 635 |
| C | 90 | 20 | 1120 | 2500 | 3575 | 645 |
| D | 90 | 20 | 1060 | 2460 | 3380 | 635 |

From the data thus obtained, it is clear that the vulcanized products containing a substituted nitroso-amine exhibit a greatly improved resistance to aging or oxidation as indicated by the oxygen bomb treatment, both with respect to intermediate and final elongation values, than the products to which such addition has not been made.

It is also shown that diaryl substituted nitroso-amines are especially effective in this respect, while those containing an alkyl substituent instead of an aryl substituent, are somewhat less effective, and with those in which both aryl substituents are replaced by alkyl radicals, the anti-oxidant or age-resisting properties are still lower.

Other compounds, which are related to the substituent nitroso-amines above defined and have been thus treated in accordance with the invention, include carbazole, nitroso-amine which may be spoken of as nitroso-N carbazole,

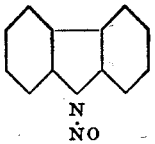

This compound is not strictly in the same category with the other compounds tested, and shows but very little improvement in the aging properties of rubber products containing it. The results are given, however, because it is related to the other nitroso-compounds. Its failure to be effective may be attributed to the valance linkage between groups corresponding to the R and R' groups of the nitroso-amine which will be apparent from the formula above given.

While the above disclosure relates to preferred instances of the application of the invention and to specific re-agents employed in specific proportions, it is to be understood that variations may be made therein and in the nature and amount of the several reagents used, according to the particular requirements of the product, as will be clear to those skilled in the art of treating rubber.

I claim:

A rubber product which has been vulcanized in the presence of di-phenyl nitroso-amine.

Signed by me at Boston, Massachusetts, this 24th day of May, 1929.

MAX H. ZIMMERMANN.